United States Patent Office ──

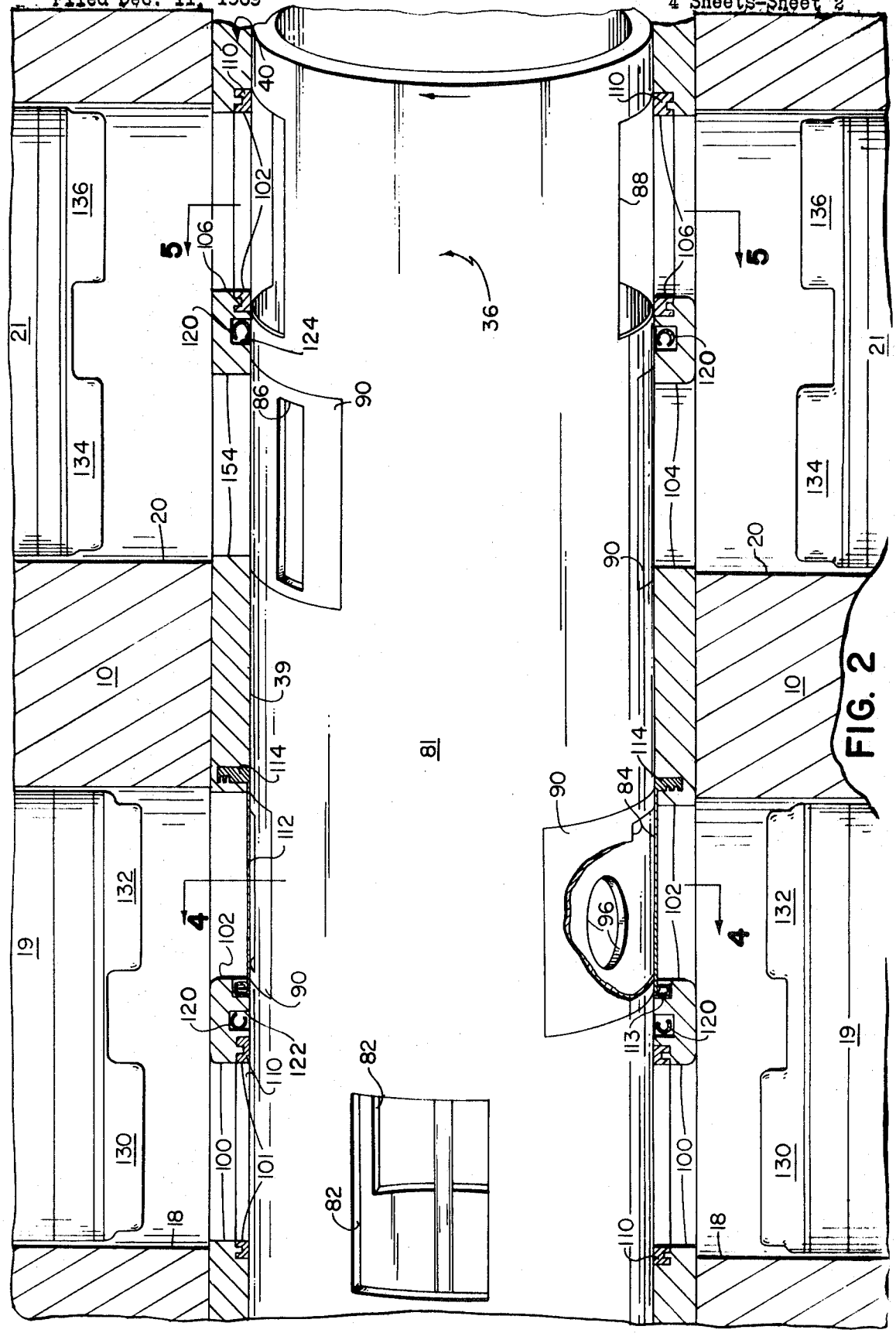

3,608,308
Patented Sept. 28, 1971

3,608,308
EXTERNAL COMBUSTION CHAMBER ENGINE
Charles C. Cary and John P. Moussouris, Cambridge,
Mass., assignors to Moca Systems, Inc., Chelmsford,
Mass.
Filed Dec. 11, 1969, Ser. No. 884,076
Int. Cl. F02g 3/00
U.S. Cl. 60—39.63    24 Claims

ABSTRACT OF THE DISCLOSURE

In a motor including two cylinders, a reciprocating piston within each cylinder and porting extending from each cylinder to a valving surface, a rotor having an outer valving surface, an interior chamber, and at least two ducts extending from the chamber and terminating in ports at the rotor valving surface. In one preferred aspect, the interior chamber is a combustion chamber and a fuel line extends from without the rotor to within the chamber. In another preferred aspect, the rotor includes three axially-spaced interior chambers and a pair of ducts extends from each chamber, each duct terminating at the rotor valving surface in a port and the ports of each pair being symmetrically positioned.

---

This invention relates to valving.

It is a principal object of one aspect of the invention to adapt the Brayton cycle, characterized by continuous combustion within a constant pressure chamber, to piston use. A principal object of a second aspect is to provide a balanced and symmetrical rotary valve for use with a motor including axially-spaced pistons. Other objects include providing a low pollution, thermally symmetric engine that can be used with a wide variety of fuels and in which continuous combustion occurs in a hot-walled chamber, producing a combustion stream of low specific volume and making possible catalysis and extended duration of combustion, and providing a symmetrical and efficient motor valving system in which all unconventional parts are cylindrical, extraneous axial and radial valving loads are eliminated, and in which a single rotor accomplishes all valving to and from symmetrically spaced pistons.

In its first aspect, the invention features, in a motor having a pair of reciprocating pistons, a rotor having an exterior valving surface and an interior combustion chamber, at least two ducts extendng from the chamber and terminating in ports at the valving surface in position for communicating with porting leading from the cylinder during rotation of the rotor, and a fuel supply line extending from without the rotor into the combustion chamber. The second aspect of the invention features a rotor having three axially-spaced interior chambers, two pairs of ducts extending from the central chamber to the cylindrical rotor surface and one pair of ducts extending from each of the other chambers to the surface, each duct terminating in a port at the surface and the ports of each pair being symmetrically positioned at opposite sides of the surface. Preferred embodiments feature symmetrically spaced rectangular ports communicating with intake, exhaust and intermediate combustion chambers, an ignition element, a plan director and a porous burner within the combustion chamber, pistons symmetrically arranged in axially-spaced banks, and adjusting the relative position of the ports providing communication between one piston and the combustion chamber in response to changes in combustion chamber pressure.

Figure 1:
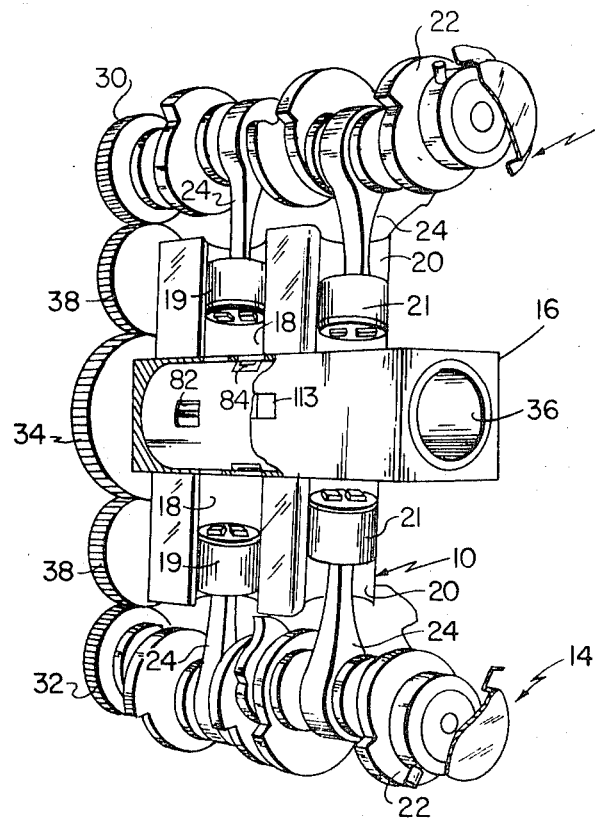
Figure 6:
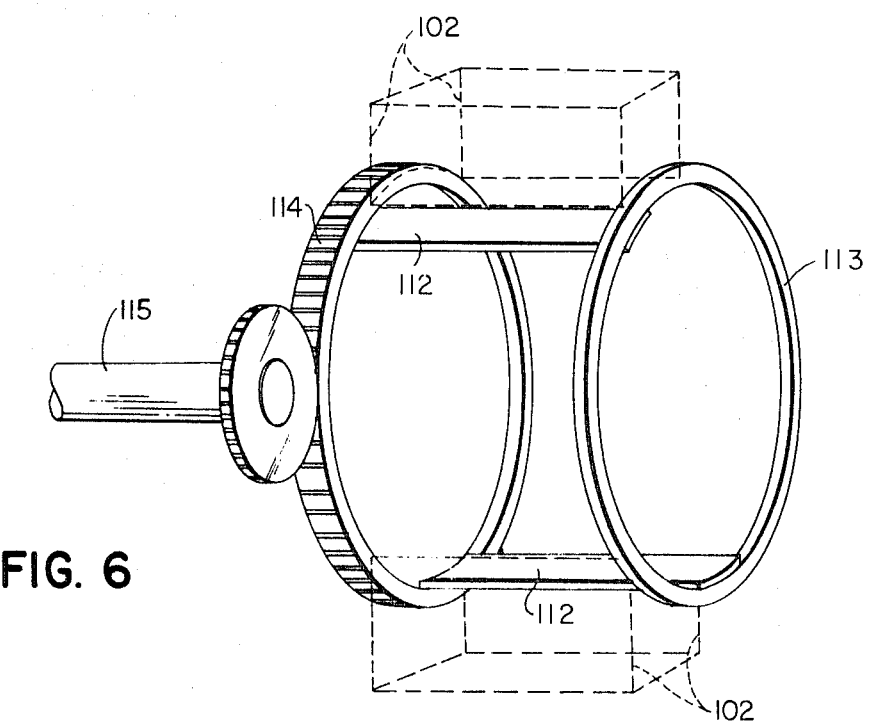
Figure 3:
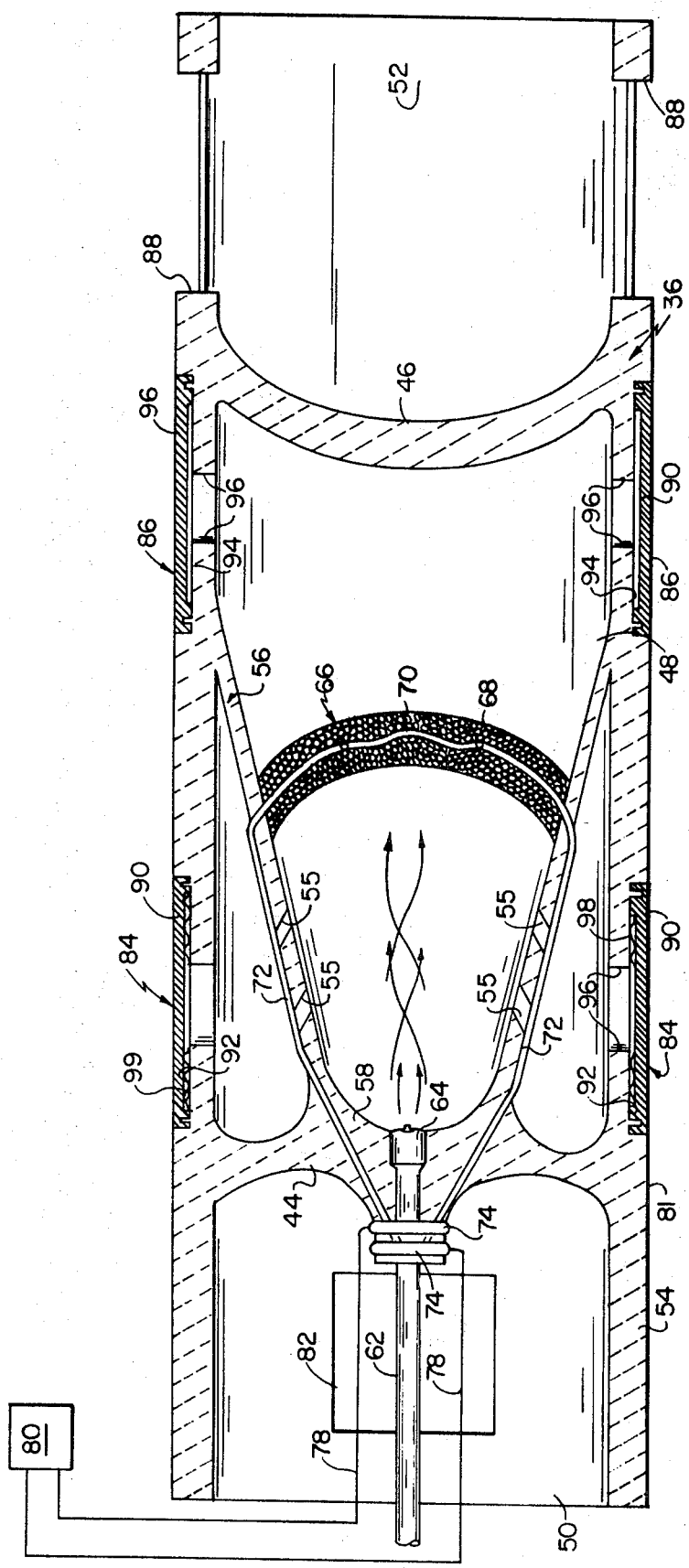
Figure 4:
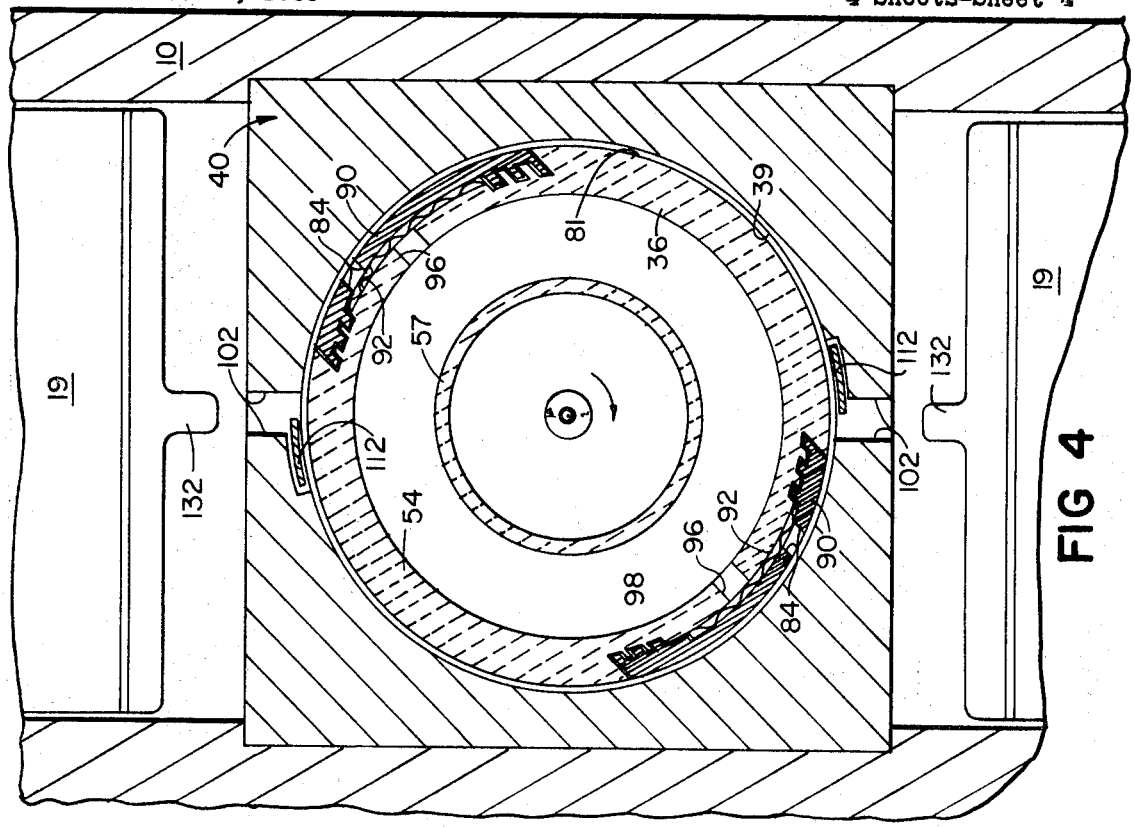
Figure 5:
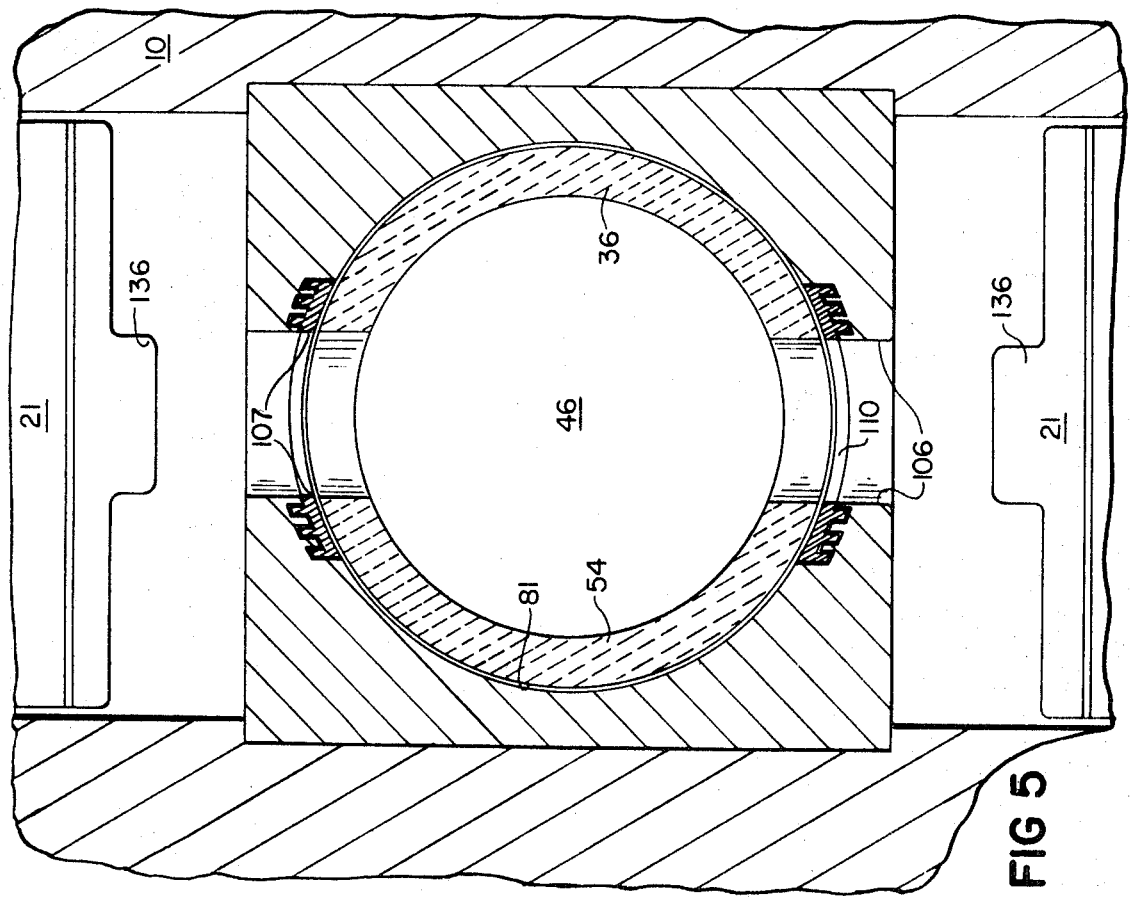

Other objects, features and advantages will appear from the following detailed description of a preferred embodiment of the invention, taken together with the attached drawings in which:

FIG. 1 is a perspective view, partially in section, of a piston engine embodying the invention;
FIG. 2 is a perspective view, partially in section, of portions of the engine of FIG. 1;
FIG. 3 is a sectional view of portions of the engine of FIG. 1;
FIGS. 4 and 5 are sectional views, taken respectively at lines 4—4 and 5—5 of FIG. 2, of portions of the engine of FIG. 1; and,
FIG. 6 is a perspective, partially diagrammatic, view of portions of the engine of FIG. 1.

Referring now to the drawings, there is shown an aluminum engine block 10 in which two banks 12, 14 of pistons are disposed on opposite sides of a central valve assembly 16. Each bank includes a pair of parallel cylindrical bores 18, 20 extending radially relative to the axis of valve assembly 16, a reciprocating piston 19, 21, respectively, within each bore, a balanced crankshaft 22, and a connecting rod 24 connecting each piston to the crankshaft. In the illustrated embodiment, pistons 19 are compressors and pistons 21 are expanders. The diameter of each bore is 4 in. and the displacement of each piston is 55 cu. in. Spur gears, designated 30, 32, and 34 respectively, are secured to an end of the crankshaft 22 of each of banks 12, 14 and to a rotatable ceramic cylindrical valve 36. The spur gears, together with intermediate idler gears 38, provide that each crankshaft rotates at twice the speed of rotation of valve 36.

As shown in FIGS. 2 through 5, valve 36 (length 10 in., outside diameter 3¾ in. inside diameter 3 in.) is mounted for rotation within the cylndrcal bore 39 of a square in cross section (minimum with thickness ¼ in.) stainless steel sleeve 40 which is in turn pressfitted within a recess extending through block 10 with the axis of bore 39 coplanar with and perpendicular to the axes of bores 18, 20. A pair of axially-spaced walls 44, 46 (each ¼ in. thick) divide valve 36 into a central combustion chamber 48 (length 6 in.), and, on opposite axial sides of combustion chamber 48, an intake chamber 50 and an exhaust chamber 52. Each of walls 44, 46 is, viewed from within combustion chamber 48, convex and includes reinforcing fillets adjacent the cylindrical wall 54 of valve 36. A ported air flow cone 56 is provided within combustion chamber 48 with its apex 58 secured to wall 44 and its base 60 secured to wall 54 at a circle approximately three-fourths of the distance from wall 44 to wall 46. A plurality of arcuate air flow ports 55, directed inwardly and axially, extend through the conical wall 57 and of cone 56.

A fuel injection line 62 extends coaxially through intake chamber 50 and wall 44, terminating at an injection spray nozzle 64 mounted at apex 58 and directed axially of chamber 48. A concave (viewed from nozzle 64) wick assembly 66 extends across the interior of cone 56 and is secured to wall 57. As shown wick assembly 66 includes a high-porosity ceramic burner 68 in which is imbedded a silicon carbide heating filament 70. A pair of electrical leads 72 extend from a filament 70 through walls 57 and 54 to ignition stators 74 mounted in intake chamber 50 coaxially with injection line 62. Leads 78 extend from stators 74 to an electrical power source and control 80.

A plurality of valving ducts extend through wall 54 of valve 36 and define, at the exterior cylindrical surface 81 of valve 36, symmetrically placed pairs of ports. As shown, the ducts extending from intake chamber 50 define compressor intake ports 82, the ducts from combustion chamber 48 define compressor discharge ports 84 and expander intake ports 86, and the ducts from exhaust chamber 52 define expander exhaust ports 88. Each port is, at surface 81, rectangular and has a length (measured axially of valve 36) of 1.75 in. The widths of the respective ports (at surface 81) and measured circumferentially are:

| Ports: | Inches |
|---|---|
| 82 and 88 | 1.2 |
| 84 | 0.15 |
| 86 | 0.3 |

Each of ports 82 and 88 is defined by a rectangular slot extending radially through wall 57. Ports 84 and 86 are defined by graphite window seals 90 mounted in recesses, designated 92, 94 respectively in the outer surface of wall 57 with the arcuate outer surface of each seal 90 lying slightly above surface 81. Each seal 90 is approximately 2 in. long (measured axially) and in width subtends an area of approximately 60°. Circular holes 96 each having an area slightly greater than that of the respective area of ports 84, 86 extend through wall 57 from combustion chamber 48 to the center of one of recesses 92, 94. A metal leaf spring 98 is mounted in each of recesses 92 between the recess base and the interior surface of the seal 90. As shown most clearly in FIG. 4, the ports defined by each of seals 90 are offset relative to holes 96.

Referring now to FIG. 2, eight rectangular slits extend through the wall of sleeve 40, in a direction radially outwardly relative to valve 36, to provide porting between valve 36 and the pistons of banks 12 and 14. As shown, the slits are arranged in four pairs, each of which includes two-axially spaced slits 1.75 in. long positioned with their longitudinal center lines parallel and extending diametrically of one of bores 18, 20 so that the slits of each pair overlie the respective bore. Of each pair of slits overlying one of bores 18, the slit 100 adapted for providing porting between intake chamber 50 and bore 18 is 1.2 in. wide and the slit 102 providing porting between the bore and combustion chamber 48 is 0.15 in. wide. The pair of slits 104, 106 overlying each of bores 20 and providing porting between the bore and combustion chamber 48 and exhaust chamber 52 are, respectively, 0.3 in. and 1.2 in. wide.

Graphite window seals 110 are mounted in recesses in the interior cylindrical surface of sleeve 40 surrounding each of slits 100 and 106, the arcuate inner surface of each seal extending slightly inwardly from the cylindrical surface 43 of sleeve 40. A rectangular slit in each seal 110, of size equal to and forming an extension of the respective one of slits 100, 106, defines a rectangular port, designated 101 and 107 respectively, at surface 43. Slits 102, 104 themselves define rectangular ports respectively at surface 43.

For varying the size of the ports defined by slits 102, thin metal slats 112 are mounted in recesses in surface 43 adjacent one side of each of ports 103. Each slat 112 extends between a pair of adjustment rings 113, 114 mounted in circumferential recesses in sleeve 42 on opposite ends of ports 102. The radially outer surface of ring 114 includes gear teeth which engage an adjustment control 115 mounted (see FIGS. 1 and 7) on a side of block 10. By slightly rotating ring 114, slats 112 can be moved, relative to sleeve to vary the width of port 102.

A pair of ring seals 120, each of which is semi-toroidal in cross-section, are mounted in circumferential recesses 122, 124 respectively in surface 43. Recess 122 is between slits 100 and 102; recess 124 is between slits 104 and 106. Each seal 120 is mounted within its respective recess with the open side of the seal facing inwardly and one edge of the seal engaging surface 81 of valve 36.

As previously mentioned, crankshafts 22 rotate at twice the speed of valve 36. Compressor pistons 19 reciprocate in phase with each other, each piston reaching top dead center (TDC) at the same time. Expander pistons 21 are also in phase with each other, but are out of phase with compressor pistons 19. Studs are provided in the top of each of pistons 19, 21 for fitting within the slits 100, 102, 104, 106 in sleeve 40 when the pistons are at top dead center to reduce the clearance volume of each piston virtually to zero. Each stud has a length and width slightly less than that of the slot into which it is to fit. Studs 130 on pistons 19 and 134 and 136 on pistons 21 have a height only slightly less than the thickness (at a slot) of sleeve 40; studs 132 are shorter to provide a slight clearance between the studs and slats 112.

Ports 82 are located so that they will open (the leading edge of each port 82 will reach an edge of a port 101 of sleeve 42) as compressor pistons 19 reach top dead center, and will close (the trailing edge of each port 82 will reach the other edge of port 101) as compressor pistons reach bottom dead center (BDC). Ports 84 are arranged to open (reach the edge of the port defined by a slit 102 and a slat 112) when the pressure within compressor piston bore 18 becomes equal to that within combustion chamber 48, and close when compressor piston 19 reaches TDC. Ports 86 open (reach an edge of a port 105) when expander pistons 20 are at TDC and close when expander pistons have completed 14 percent (approximately 25° rotation of crankshafts 22) of their downward stroke. Ports 88 open at expander piston BDC and close when the expander pistons reach TDC.

In operation, fuel injected continuously into combustion chamber 48 through line 62 and nozzle 64 is sprayed onto burner 68. In starting the engine, electric current is passed through heating element 70 so that the fuel will ignite on contact with the heater. After the engine has reached running temperature, the entire wick assembly is hot enough to produce continuous combustion without requiring separate heating of element 70. The resistance of element 70, however, is temperature dependent, and control 80 continuously monitors the resistance thereby to sense when the wick assembly becomes too hot and, when such overheating is evident, reduce the rate of fuel supply.

Air is drawn into compressor pistons 19 (through intake chamber 48) during the downstroke of the compressors, compressed on the upstroke until the air pressure equals the pressure within combustion chamber 48, and then discharged into chamber 48 in that compressed condition. The combustion chamber pressure varies according to the rate of fuel supply. Control 113 is responsive to the fuel supply and moves slats 112 in response to sensed changes in the fuel rate as required to insure that the compressor piston and combustion chamber pressures are substantially equal when compressor exhaust ports 84 open.

Hot, high pressure gas (resulting from the continuous combustion of the injected fuel) is discharged into driver pistons 21 and, as it expands, drives the pistons downward. The expanded gas is discharged from the engine, through exhaust chamber 52, on the driver piston upstroke.

In the disclosed embodiment, in which each of pistons 19, 21 has a displacement of 55 cu. in., the maximum output of the engine is approximately 125 H.P. The output of the engine can be significantly increased by turbo-supercharging the air supplied to intake chamber 50 or by passing the gas from the exhaust chamber 52 through an exhaust blowdown turbine.

Other embodiments within the scope of the following claims will occur to those skilled in the art.

What is claimed is:

1. In a device of the type including $n$ compressors and $m$ expanders, each of said expanders including an output and $n$ and $m$ being integers not less than one, that improvement comprising:
   means for continuously combusting a mixture of air and fuel and including a combustion chamber and a fuel supply line extending from without to within said combustion chamber;
   a circular in cross section valving member mounted for rotation about its central axis, said valving member defining a portion of said combustion chamber and at least one outwardly facing valving surface;

inlet means for permitting gaseous fluid to flow into said combustion chamber only from said compressors;

outlet means for permitting gaseous fluid to flow from said combustion chamber to only said expanders, said outlet means including at least one duct extending from each of said expanders to a valving surface and there terminating in a port and at least one duct extending from said combustion chamber to an outwardly facing surface of said member and there terminating in a port;

means for preventing flow of gaseous fluid into and from said combustion chamber other than through one of said inlet and outlet means; and means for rotating said valving member relative to said valving surface in a manner being a predetermined relationship to the movement of the outputs of said expanders, each of said ports at said valving surface being positioned for communicating with a port at said outwardly facing surface during said rotation.

2. The device of claim 1 wherein said inlet means includes at least one duct extending from each of said compressors to a valving surface and there terminating at a port, and at least one duct extending from said combustion chamber to an outwardly facing surface of said member and there terminating in a port, each of said inlet means ports at said valving surface being positioned for communicating with an inlet means port at said outwardly facing surface during said rotation.

3. The device of claim 1 wherein said outwardly facing surface is at least in part cylindrical, said rotor is mounted for rotation about the axis of said cylindrical surface, and said outlet means includes two ducts extending from said combustion chamber, each of said ducts terminating at a port at said cylindrical surfaces, said ports being symmetrically positioned at opposite sides of said surface.

4. The device of claim 3 wherein said inlet means includes a duct extending from each of said compressors and terminating in a port at valving surface and two ducts extending from said combustion chamber and terminating in respective ports at and symmetrically positioned about said cylindrical surface, each of outlet means ports at said cylindrical surface being identical, and each of said inlet means ports being identical.

5. The device of claim 4 wherein each of the ports at said valving surface is substantially identical to one of said inlet and outlet means ports.

6. The device of claim 3 wherein each of said expanders comprises a relatively reciprocating piston and cylinder and completes an integral number of reciprocating cycles during each revolution of said rotor.

7. In a motor of the type including a compressor, an expander, and at least one duct extending from each of said compressor and expander to a respective valving surface, and terminating at said respective valving surface in a port, in combination:

a combustion chamber;

a rotor mounted for rotation about an axis and defining at least one outwardly facing valving surface, said rotor defining at least a portion of said chamber and including at least two ducts extending from said combustion chamber defining portion to a respective one of said outwardly facing surfaces, each of said ducts terminating in a port at said respective outwardly facing surface;

a heating element within said combustion chamber;

a fuel supply line extending from without said rotor to within said combustion chamber and terminating in a nozzle directed axially of said chamber for directing fuel towards said heating element; and, means for rotating said rotor relative to said respective valving surface, each of said ports at said outwardly facing surface being positioned for communicating with a port at a said respective valving surface during said rotation.

8. The motor of claim 7 including means connected to said heating element for sensing the temperature of said burner.

9. The motor of claim 7 including a porous burner within said combustion chamber, said heating element being mounted on said burner.

10. The motor of claim 7 wherein a second duct extends from each of said compressor and expander and terminates at a port at a said respective valving surface, said outwardly facing surface of said rotor is cylindrical, and said rotor includes an interior intake chamber on one axial-side of said combustion chamber, an interior exhaust chamber on the other axial side of said combustion chamber, and at least one duct extending from each of said intake and exhaust chambers to said cylindrical surface and terminating at said cylindrical surface in a port, each of said ports associated with said intake and exhaust chambers being adapted for communicating with a port of one of said second ducts during said rotation.

11. In a motor of the type having a compressor and an expander and at least two ducts extending from each of said compressor and expander to a valving surface, each of said ducts terminating at said valving surface in a port, in combination:

a rotor defining an outwardly facing cylindrical valving surface mounted for rotation about the axis of said surface, said rotor having three axially-spaced interior chambers therein, at least two ducts extending from the central one of said chambers to said cylindrical surface, and at least one duct extending each of the other ones of said chambers to said cylindrical surface, each of said ducts of said rotor terminating at said cylindrical surface in a port; and, means for rotating said rotor relative to said first mentioned valving surface, each of said ports at said cylindrical surface being positioned for communicating with a port at said first mentioned surface during said rotation.

12. The motor of claim 11 wherein said rotor includes two pairs of ducts extending from the central one of said chambers to said cylindrical and there terminating in respective ports at said cylindrical surface, each of the ports of each of said pairs being substantially identical to the other port of said each pair.

13. The motor of claim 12 wherein the ports of each of said pair are substantially identical to the port at said first-mentioned surface with which said ports of said each pair communicate.

14. The motor of claim 12 wherein each of said compressor and expander comprises a relatively reciprocating piston within a cylinder, one pair of ports associated with said central one chamber communicates with a port associated with one of said cylinders during an upstroke of the piston within said one cylinder, and the other pair of ports associated with said central one chamber communicates with a port associated with the other of said cylinders during a downstroke of the piston within said other cylinder.

15. The motor of claim 14 wherein the pair of ports associated with one of said other ones of said chambers communicate with a port associated with said one cylinder during a downstroke of the piston within said one cylinder.

16. The motor of claim 15 wherein the pair of ports associated with the other one of said other ones of said chambers communicate with a port associated with said other cylinder during an upstroke of the piston within said other cylinder.

17. The motor of claim 11 including means for supplying fuel to said central one chamber and a port adjustment control system responsive thereto for varying the relative positions of said one pair of ports and said port associated with said compressor in response to changes in the rate of fuel supply to said central one chamber.

18. The motor of claim 11 wherein said central one chamber is a combustion chamber and including a fuel supply line extending from without said rotor to within said combustion chamber.

19. The motor of claim 18 including within said combustion chamber an ignition element and wherein said supply line terminates in a nozzle directed axially of said combustion chamber and toward said ignition element.

20. The motor of claim 14 wherein each of said ports is rectangular.

21. The motor of claim 14 including $2n$ cylinders, $n$ being an integer, arranged in two axially-spaced sets, each of said sets including $n$ cylinders, the axis of each of said cylinders being perpendicular to the axis of said cylindrical surface, and the axes of the cylinders of each set being in a common plane.

22. The motor of claim 21 wherein the cylinders of each of said sets are regularly circumferentially spaced.

23. The motor of claim 18 wherein said combustion chamber is substantially cylindrical and including within and concentric therewith a conical flow director, the apex of said director being adjacent one axial end of said combustion chamber, said fuel supply line extending into said director, and the conical surface of said director including a plurality of ducts extending therethrough.

24. The motor of claim 11 wherein each of said chambers is substantially cylindrical.

References Cited
UNITED STATES PATENTS 2,131,216   9/1938   Brooke _____ 60—39.6

WENDELL E. BURNS, Primary Examiner

U.S. Cl. X.R.

123—190 A